March 31, 1931.   F. J. SPANG   1,798,229
PROCESS OF MAKING DRILL BITS
Filed March 13, 1926   2 Sheets-Sheet 1
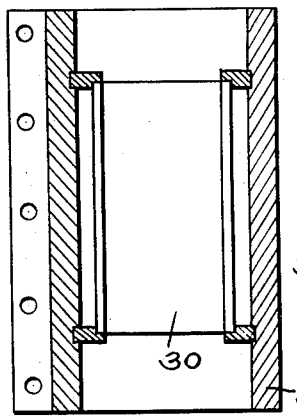
FIG.1.
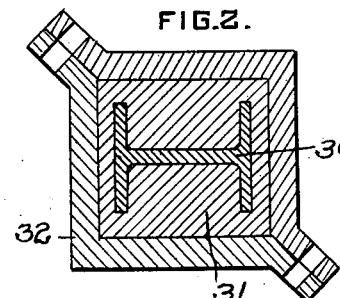
FIG.2.
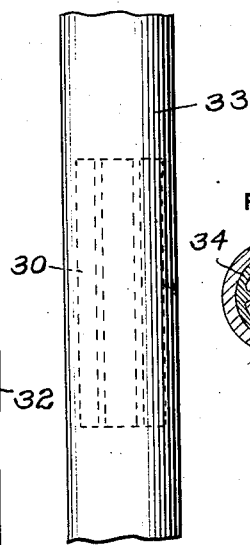
FIG.3. FIG.4.
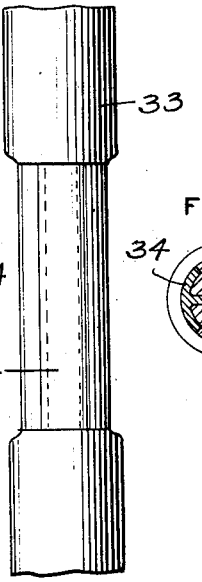
FIG.5. FIG.6.
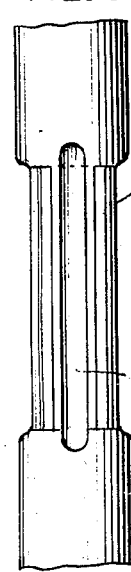
FIG.7.
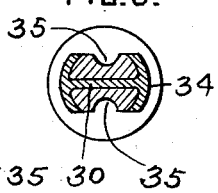
FIG.8.
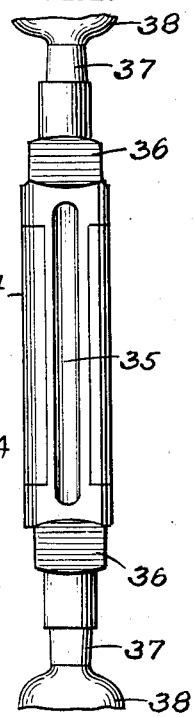
FIG.9.
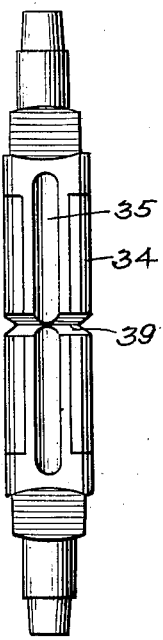
FIG.10.
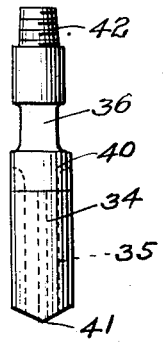
FIG.11.
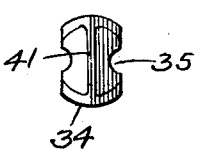
FIG.12.
WITNESS
J. Herbert Bradley.
INVENTOR
Ferdinand J. Spang
By Green & McAllister
His Attorneys
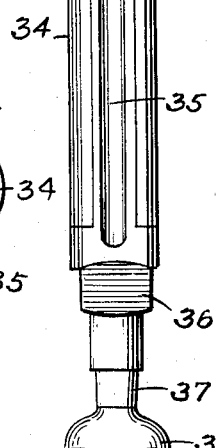

March 31, 1931.    F. J. SPANG    1,798,229
PROCESS OF MAKING DRILL BITS
Filed March 13, 1926    2 Sheets-Sheet 2
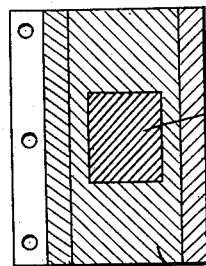
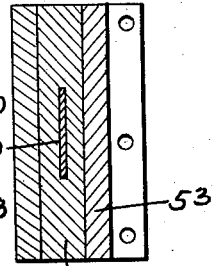
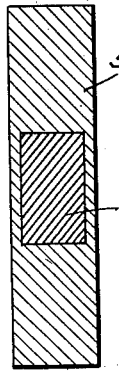
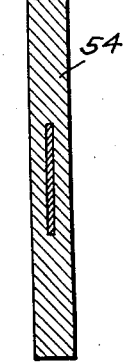
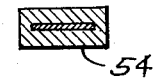
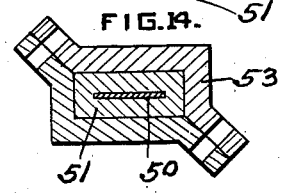
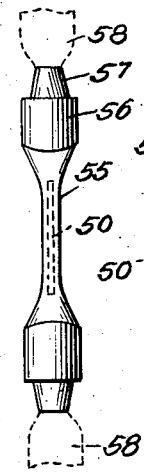
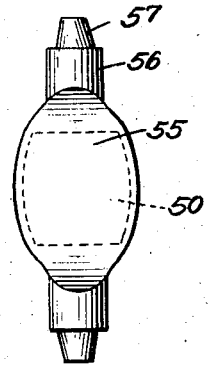
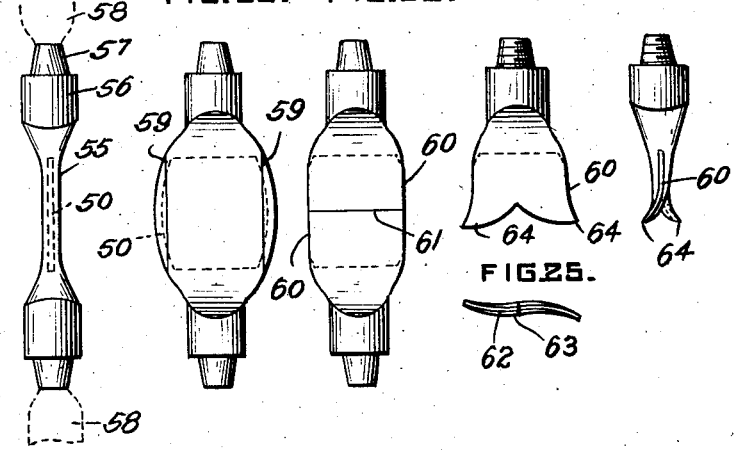
WITNESS
J. Herbert Bradley
INVENTOR
Ferdinand J. Spang
By Green and McAllister
His Attorneys Patented Mar. 31, 1931

1,798,229

UNITED STATES PATENT OFFICE

FERDINAND J. SPANG, OF BUTLER, PENNSYLVANIA, ASSIGNOR TO SPANG AND COMPANY, OF BUTLER, PENNSYLVANIA, A CORPORATION OF PENNSYLVANIA

PROCESS OF MAKING DRILL BITS

Application filed March 13, 1926. Serial No. 94,462.

This invention relates to drill bits such as are in general use for penetrating the various formations encountered in drilling oil, gas and artesian wells.

Drill bits of this type are usually formed of steel and are secured to the lower end of a string of tools which now take the place of the old time sinker bar and which are lowered into the well hole for drilling purposes. The drilling operation performed by the bit consists in cutting the formation into granular pieces, pulverizing these pieces into finer particles and then mixing these smaller or powdered particles with fluid in the hole so that they may be bailed out with such fluid.

It will be apparent that such an operation is very hard on the steel of which the bit is formed. It must, therefore, be very carefully heat treated to prevent breaking under the strain set up by the drilling operation. The cutting edge must be hard enough to cut material without wearing rapidly while the shank of the bit must be sufficiently tough to prevent cracking or the breaking off of small pieces which, of course, have to be pulverized to permit their removal from the well.

An object of this invention is to provide an improved method of manufacturing drill bits for the purpose set forth.

A further object is to provide a bit for use in drilling wells which is so constructed and arranged as to have a hard, long wearing cutting edge and a tough, less brittle shank which will not chip or crack.

These and other objects which will be apparent to those skilled in this particular art are accomplished by means of the invention illustrated by way of example in the accompanying drawings, in which Figure 1 is a sectional view through an ingot mold illustrating a preliminary step used in carrying out one form of this invention. Fig. 2 is a transverse sectional view through the ingot mold illustrating another step used in carrying out the same embodiment. Figs. 3 to 12 are views showing the progressive formation of one form of drill bit from the ingot shown in Fig. 2. Figs. 13 and 14 are views similar to Figs. 1 and 2, illustrating the application of this invention to the formation of a different type of drill bit, and Figs. 15 to 26 are views illustrating the progressive formation of the latter type of bit.

The present invention is applicable to the manufacture of different types of drill bits such, for example, as the two forms illustrated and described in the present application.

In carrying out the particular forms of the invention which are illustrated in the accompanying drawings, a hard metal liner which is preferably formed of self hardening steel is surrounded by an envelope of softer or tougher steel which unites with the hard metal liner by a welding process. The ingot so formed is subjected to a forging or shaping operation to provide a bar or blank of suitable shape. A part of the soft metal envelope of the blank is then removed, preferably by a cutting operation, so as to expose a portion of the hard metal liner. The portions of the liner which are thus exposed become the wearing surfaces of the finished drill bit and a part of such exposed surface is suitably formed to provide the cutting edges of the finished bit. As illustrated, the invention may conveniently be carried out so as to form two drill bits from each blank.

As illustrated in Figs. 1 to 12, the invention is shown as applied to the manufacture of an improved form of reciprocating drill bit. An I-beam 30 of hardened steel is surrounded by an envelope 31 of softer, tough steel, preferably by casting the envelope in a mold 32 about the liner with which it unites by substantially a welding operation. The liner 30 is so supported within the mold that the soft metal will surround it on all sides and at both ends. An ingot of tough steel having a hard metal interior is thus formed. This ingot is then formed into a blank which, in the present embodiment, takes the form of a substantially round bar 33 which can be conveniently formed from the ingot by rolling and in this operation the flanges of the I-beam are bent so as to form curved surfaces 34 within the bar. The metal of the bar around the hardened steel interior is then removed so as to expose the surfaces 34 of the hardened interior and this can conveniently be done by turning. The exposed surfaces 34 ultimately become the wearing surfaces of the finished bit. Between the wearing surfaces the tough envelope is grooved to provide the usual water courses 35 and the partially formed blank is then subjected to a forging operation for the purpose of shaping each end of the bar beyond the hardened metal interior so as to form wrench faces 36 and blank sections 37 for receiving screw threads on each end of the blank.

The porous steel formed by the forging at each end 38 of the blank is then removed by cutting after which the blank is severed by a cut 39 through its center transversely to the axis. The cuts 39 are made from the diametrically opposite sides of the partially formed bit shown in Fig. 10 and are of substantially V-shape so as to provide a finished bit 40, the cutting edges 41 of which are formed at the end of the wearing surfaces 34. As illustrated the V-cuts 39 meet in the center of the web of the hardened liner.

It will thus be apparent that a drill bit is provided which has a tough strong shank formed with hard long wearing faces and cutting edges.

After formation, the blank portion 37 of each bit is provided with threads 42 so that it can be secured to the usual string of tools. Although the illustrated embodiment discloses the formation of two bits from a single ingot it will be obvious that one bit can be formed from an ingot if desired.

As illustrated in Figs. 13 to 26, the invention is shown as applied to the formation of the so called fish tail drilling or cutting bit. In this application of the invention a hard steel liner 50 in the form of a flat plate is surrounded by a soft steel envelope 51 preferably by casting the same in a mold 53 about the liner with which it unites.

The ingot of soft steel with the hard interior is then forged to provide a bar 54 of rectangular cross section as illustrated in Figs. 16 to 18.

The central portion of the bar 54 opposite the broad faces of the slab 50 is then flattened or spread out to form a relatively thin central section 55 as illustrated in Figs. 20 and 21 and at the same time the wrench faces 56 and the blank section 57 for the threads can conveniently be formed at each end of the blank and the porous steel 58 at each end thereof is then severed or cut off. The sides of the flattened blank are then cut so as to provide parallel edges 59 and it will be apparent from Figs. 22 and 23 that such a cutting operation exposes the edges of the hardened slab 50 so as to form hardened wearing surfaces 60 on each side of the blank. The blank is next cut in half along the line 61, thus exposing a cut edge 62 of the hardened liner which is enclosed on each side by the soft steel shank 63. The cut edge is then shaped as shown in Figs. 24 and 26 to form the cutting edges of a fish tail drilling bit having hardened wearing surfaces 60 and cutting edges 64 formed by the exposed edges of the hardened metal liner.

It will also be apparent that although the invention is illustrated as showing the formation of two fish tail cutting bits from a single ingot, it is equally applicable to the formation of a single bit therefrom.

The various cutting and forging operations can be performed in any desired manner. The water courses 35 can be formed by milling or planing and the cutting of the blank illustrated in Fig. 5 can be done by turning, planing or stripping by any satisfactory stripping process.

The invention provides a drilling bit with cutting edges, centers and wearing surfaces of self hardening steel supported by a tough steel shank or envelope which, due to its composition, will not fracture or break.

Although I have described certain specific embodiments of the present invention it will be apparent that various changes, additions, omissions and substitutions can be made in the particular series of steps involved without departing from the spirit of the invention or the scope of the appended claims.

What I claim as new and desire to secure by Letters Patent is:

1. The method of making drill bits which consists in providing an ingot of soft metal having a hard metal liner, forging the ingot into a bar, shaping the central portion of said bar about said liner, cutting the soft metal of the ingot to expose a portion of said liner so as to form hardened wearing surfaces and forming drilling edges from said exposed surfaces.

2. The method of making fish tail drill bits which consists in casting a soft metal envelope around a hard metal liner, rolling the ingot so formed to provide a bar, forging the metal of the bar to form a relatively thin flat central portion, cutting the bar in half at the flattened portion thereby exposing the edges of said hard metal liner in the flattened portion so as to form wearing surfaces and shaping the ends of said surfaces to form fish tail cutting edges.

3. The method of making fish tail drill bits which consists in providing a soft metal ingot having a relatively thin hardened metal interior, forging said ingot into a bar, flattening said bar opposite said interior of hardened metal, cutting said bar in half at the flattened portion so as to expose the longitudinal edges of said hardened metal to form wearing surfaces, and forming cutting edges from said exposed surfaces.

4. The method of making fish tail drill bits which consists in providing a metal ingot having a hardened metal plate embedded therein, rolling said ingot to form a bar, flattening said bar to thin the same adjacent said plate, removing the edges of said flattened portion to expose longitudinal edges of said plate to form wearing surfaces, shaping the ends of the blank to provide shanks, cutting the blank in half at the flattened portion and shaping the cut edges to provide drilling edges.

In testimony whereof, I have hereunto subscribed my name this 11th day of March, 1926.

FERDINAND J. SPANG.